United States Patent [19]

Tanaka et al.

[11] Patent Number: 5,235,229
[45] Date of Patent: Aug. 10, 1993

[54] VEHICULAR AC GENERATOR

[75] Inventors: Toshinori Tanaka; Yutaka Kitamura; Isao Hamano, all of Hyogo, Japan

[73] Assignee: Mitsubishi Denki K.K., Tokyo, Japan

[21] Appl. No.: 945,616

[22] Filed: Sep. 16, 1992

[30] Foreign Application Priority Data

Oct. 15, 1991 [JP] Japan .................................. 3-296256

[51] Int. Cl.$^5$ .............................................. H02K 9/06
[52] U.S. Cl. .................................... 310/62; 310/63; 310/89
[58] Field of Search .................. 310/62, 51, 63, 89, 310/90, 254, 263, 58, 261, 59; 416/273 B, DIG. 3

[56] References Cited

U.S. PATENT DOCUMENTS

| | | | |
|---|---|---|---|
| 821,249 | 5/1906 | Lundell | 310/62 U X |
| 1,267,828 | 5/1918 | Wiard | 310/62 |
| 1,476,776 | 11/1923 | Stamm | 310/51 |
| 3,075,106 | 1/1963 | Chi | 310/62 U X |
| 3,518,468 | 6/1970 | Wightman | 310/63 |
| 5,028,826 | 7/1991 | Kitamura | 310/62 |

FOREIGN PATENT DOCUMENTS

| | | | |
|---|---|---|---|
| 2247842 | 5/1975 | France | 310/62 |
| 2192432 | 1/1988 | United Kingdom | 416/DIG. 3 |

Primary Examiner—R. Skudy
Attorney, Agent, or Firm—Sughrue, Mion, Zinn, Macpeak & Seas

[57] ABSTRACT

A vehicular AC generator comprises a stator connected to a front bracket and a rear bracket, a rotor fixedly mounted on a rotational shaft rotatably supported by both the brackets, and a front fan and a rear fan each serving for cooling the generator. A plurality of air intake holes are formed around the inner circumstance of each bracket, while a plurality of air outlet holes are formed around the outer circumstance of the same. As the rotor is rotated, cooling air is introduced into the generator through the air intake holes and then exhausted to the outside through the air outlet holes while cooling the interior of the generator. The number of blades on each fan is set to a certain odd numeral, and moreover, the number of blades on the front fan is different from that of the rear fan. The number of blades on each fan may be set to an odd numeral which is not a multiple of numeral of three. Alternatively, the number of blades on at least the front fan may be set to an odd number which is not a multiple of the number of air intake holes formed on the front bracket. The aforementioned characterizing feature of the vehicular AC generator is equally applicable to a three-phase AC generator as it is.

5 Claims, 5 Drawing Sheets

VEHICULAR AC GENERATOR

BACKGROUND OF THE INVENTION

The present invention relates generally to a vehicular AC generator including a silent-pole type rotor supported by brackets. More particularly, the present invention relates to improvement of a vehicular AC generator of the foregoing type including front and rear fans secured to the opposite ends of magnetic pole cores wherein the composite air stream sound generated by both the fans can substantially be attenuated.

To facilitate understanding of the present invention, a conventional vehicular AC generator will be described below with reference to FIG. 3 and FIG. 4.

Figure 3:
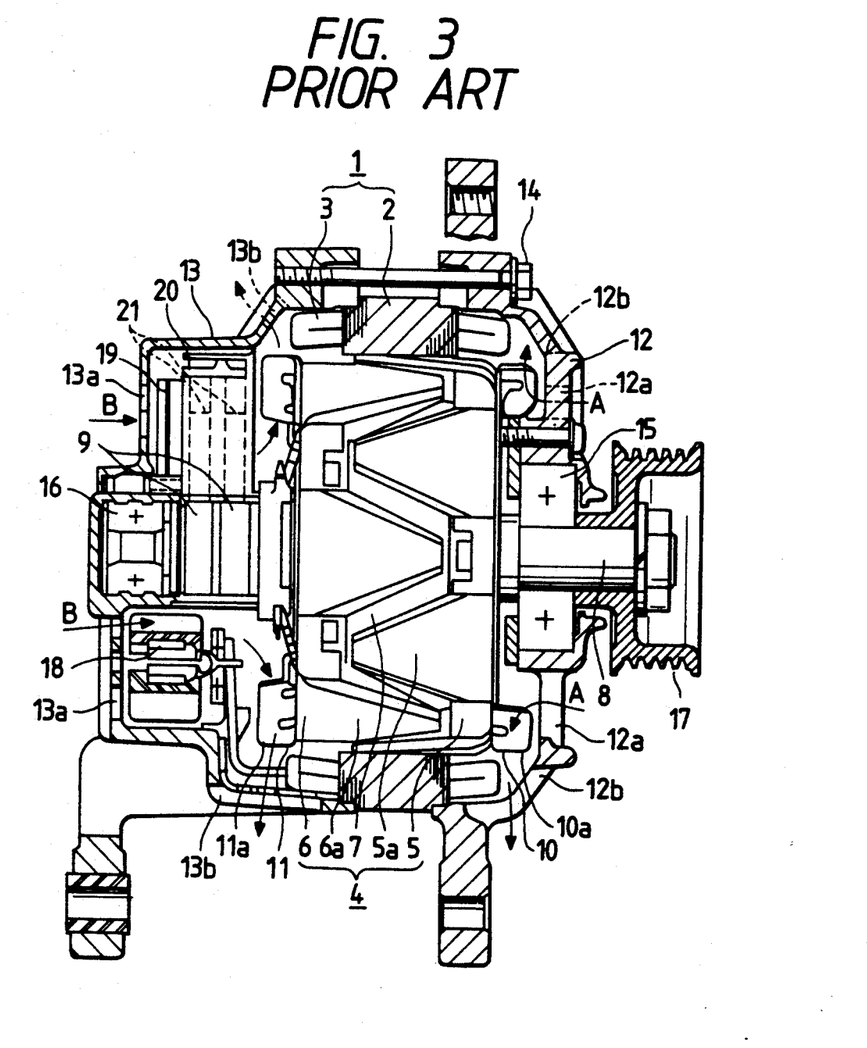
FIG. 3 is a vertical sectional view of a conventional vehicular AC generator.
Figure 4:
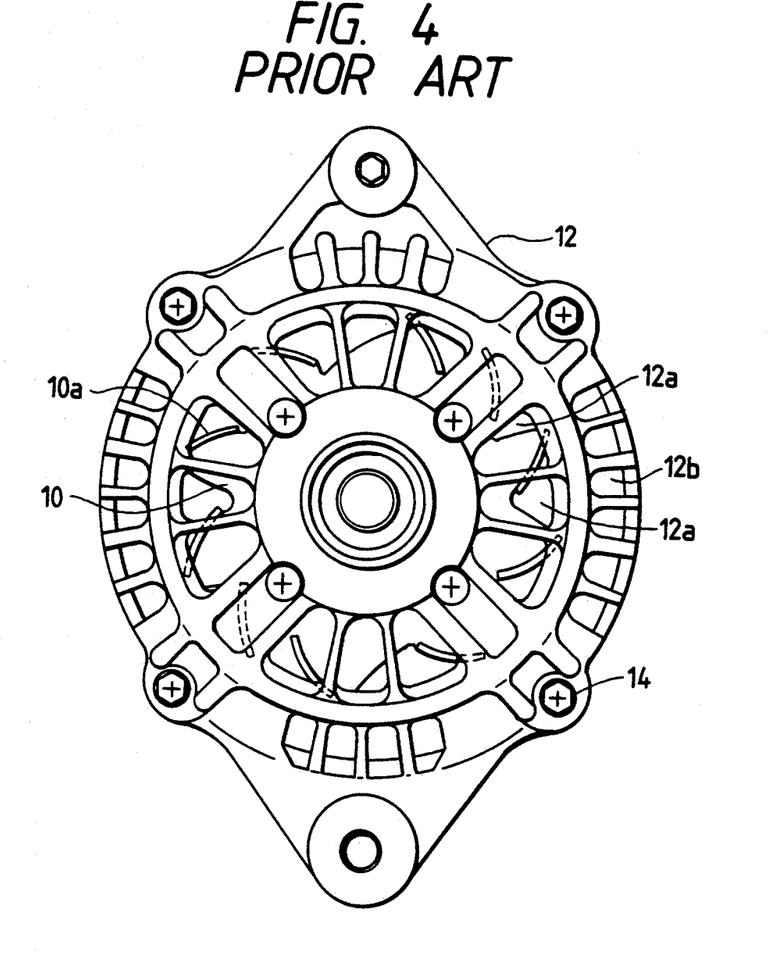
FIG. 4 is a front view of the generator shown in FIG. 3.

FIG. 3 is a vertical sectional view of the generator and FIG. 4 is a front view of the same. In FIG. 3, reference numeral 1 designates a stator. The stator 1 is constructed of a stator core 2 and a stator coil 3. Reference numeral 4 designates a rotor. The rotor 4 is constructed in the following manner. Reference numerals 5 and 6 designate magnetic pole cores each having a different polarity. Tooth-shaped magnetic pole portions 5a and 6a of the magnetic pole cores 5 and 6 are alternately arranged in the circumferential direction in the projected state. Reference numeral 7 designates an excitation coil, reference numeral 8 designates a rotational shaft on which the magnetic pole cores 5 and 6 are fixedly mounted, reference numeral 9 designates a pair of slip rings which are fixedly mounted on the rotational shaft 8 with an electrical insulating sleeve (not shown) interposed there-between, and reference numerals 10 and 11 designate fans which are secured to the magnetic pole cores 5 and 6, respectively.

In addition, reference numeral 12 designates a front bracket and reference numeral 13 designates a rear bracket. Both the brackets 12 and 13 are connected to the stator core 2 by tightening a plurality of bolts 14 of which only one is shown in the drawing. To maintain proper ventilation for the purpose of cooling the generator, a plurality of air intake holes 12a are formed around the inner circumference of the front bracket 12 and a plurality of air outlet holes 12b are formed around the outer circumference of the same. Similarly, a plurality of air intake holes 13a are formed around the inner circumference of the rear bracket 13 and a plurality of air outlet holes 13b are formed around the outer circumference of the same for the purpose of maintaining ventilation. The rotational shaft 8 is rotatably supported by the front bracket 12 and the rear bracket 13 with the aid of bearings 15 and 16. Reference numeral 17 designates a pulley which is fixedly mounted on the rotational shaft 8. As an engine (not shown) operates, the rotational force generated by the engine is transmitted to the rotor 4 via a belt (not shown) and the pulley 17.

Reference numeral 18 designates a rectifier for rectifying AC voltage induced by the stator coil 3 to DC voltage, and reference numeral 19 designates a voltage regulator for detecting an output voltage from the rectifier 18 to adjust a terminal voltage to a predetermined value by controlling the excited current. Reference numeral 20 designates a brush holder. The brush holder 20 serves to bring a brush 21 held thereby in pressure contact with the slip rings 9 so as to allow the excited current to be supplied to consumer' units or instruments via the brush 21.

With the AC generator constructed in the above-described manner, as the rotor 4 is rotated, AC voltage is induced in the stator coil 3, causing electric power to be supplied to consumer's units or instruments while generating heat. To cool the stator 1 and the rotor 2, the front fan 10 and the rear fan 11 are rotated, whereby the air in the generator is ventilated to the outside.

As the front fan 10 is rotated, cooling air is first introduced into the generator through the air intake holes 12a on the front bracket 12 in the A arrow-marked direction to cool the stator 1, and thereafter, it is exhausted to the outside through the air outlet holes 12b. On the other hand, as the rear fan 11 is rotated, cooling air is first introduced into the generator through the air intake holes 13a on the rear bracket 13 in the B arrow-marked direction to cool the rectifier 18, the voltage regulator 19, the commutator section and the stator 1, and thereafter, it is exhausted to the outside through the air outlet holes 13b.

Figure 5:
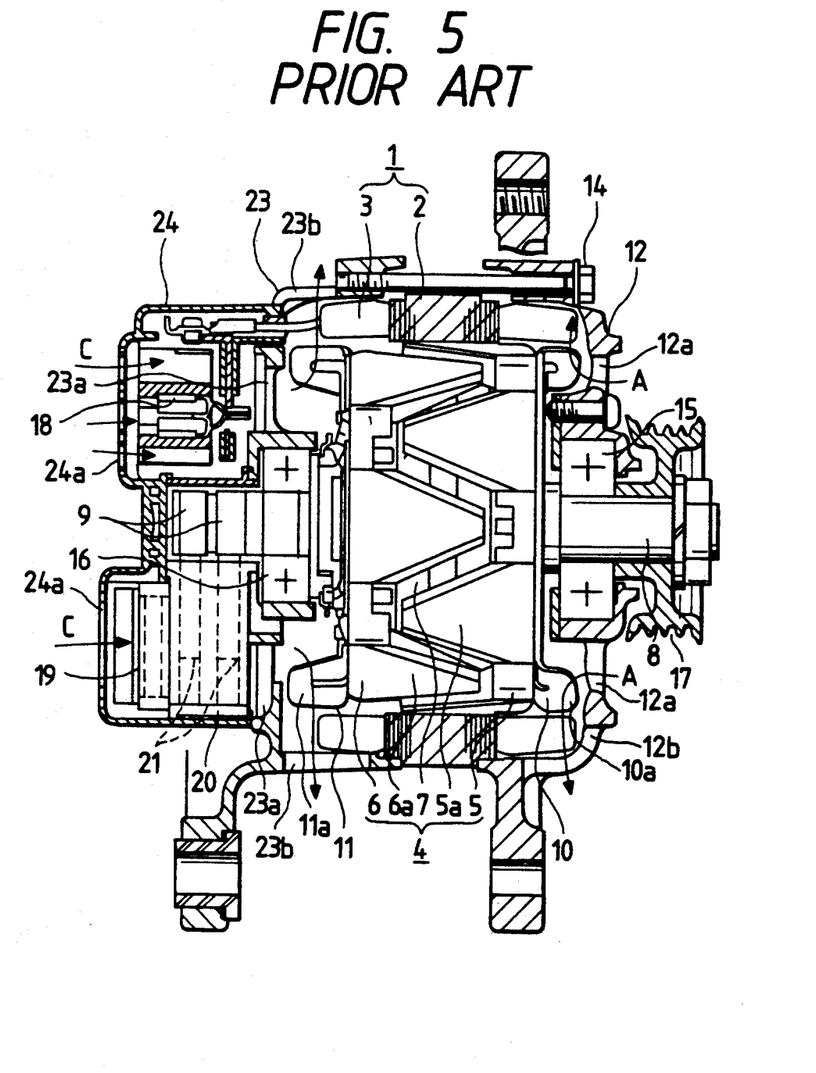
FIG. 5 is a vertical sectional view of other conventional vehicular AC generator.

FIG. 5 is a sectional view of other conventional AC generator of which structure is identical to that of the generator shown in FIG. 3 with the exception that slip rings 9, a rectifier 19 and a brush holder 20 are arranged outside of a rear bracket 23. A plurality of air intake holes 23a are formed around the inner circumference of the rear bracket 23 and a plurality of air outlet ports 23b are formed around the outer circumference of the same. In FIG. 5, reference numeral 24 designates a cover which is attached to the outer end of the rear bracket 23. In addition to the air intake holes 23a, a plurality of air intake holes 24a are formed through the cover 24. As the rear fan 11 is rotated, cooling air is first introduced into the generator through the air intake holes 24a on the cover 24 in the C arrow-marked direction and then flows through the air intake holes 23a on the rear bracket 23, and thereafter, it is exhausted to the outside through the air outlet holes 23b.

Referring to FIG. 4 again, the generator includes twelve magnetic poles and twelve air intake holes 12a on the front bracket 12, while the front fan 10 has ten blades 10a.

Figures 6, 7, 8:
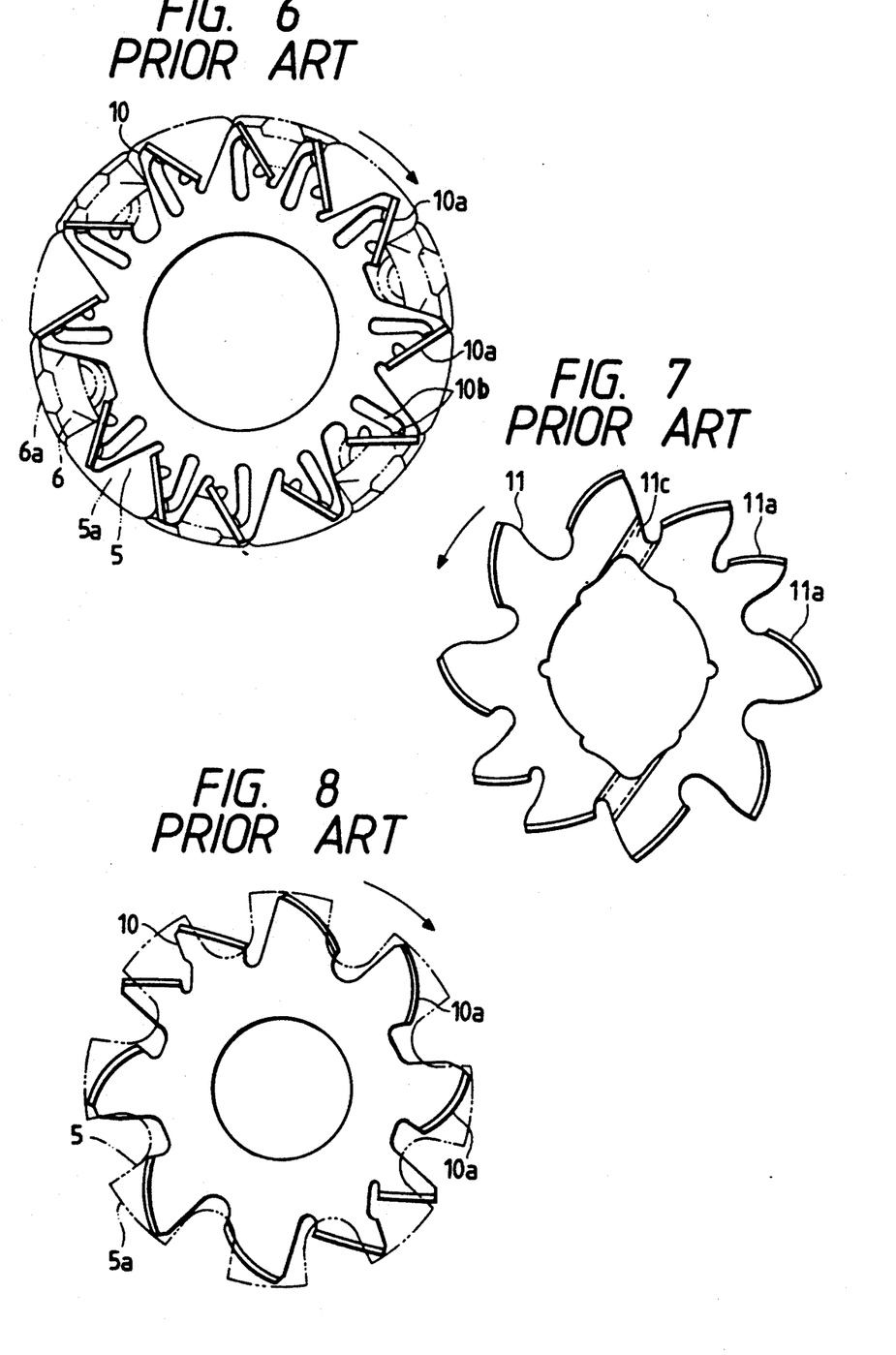
FIG. 6 is a front view of a front fan for the generator shown in FIG. 5.
FIG. 7 is a front view of a rear fan for the generator shown in FIG. 5.
FIG. 8 is a front view of a front fan for another conventional vehicular AC generator.

FIG. 6 is a front view of a front fan for another conventional AC generator and FIG. 7 is a front view of a rear fan of the same. As shown in FIG. 6, the generator includes twelve magnetic pole cores 5 and 6, while the front fan 10 has twelve blades 10a. In the drawing, reference numeral 10b designates a reinforcement rib which is press-formed on each blade 10a. On the other hand, as shown in FIG. 7, the rear fan 11 has ten blades 11a. In the drawing, reference numeral 11c designates projected parts which are press-formed on the rear side of the rear fan 11 so as to allow lead wires for an excitation coil 7 to extend therethrough.

FIG. 8 is a front view of a front fan for another conventional vehicular AC generator, particularly illustrating case that the generator includes sixteen magnetic pole cores and the front fan 10 has ten blades 10a wherein the magnet pole cores are not shown in the drawing for the purpose of simplification of illustration.

With each of the conventional vehicular AC generators constructed as described above, there arises a problem that the degree component of the air stream sound generated by both the fans coincides with the degree component of the air stream generated by the magnet pole cores, resulting in the sound level of the composite air stream sound being elevated, since the generator includes an even number of magnetic poles (twelve magnetic poles, sixteen magnetic poles or the like), the front fan 10 has an even number of blades (ten blades, twelve blades, fourteen blades or the like), and the rear fan 11 has an even number of blades (ten blades, twelve blades or the like). In the case of a three-phase AC generator, the stator core 2 has thirty six slots when the generator includes twelve magnetic poles and it has forty eight slots when it includes sixteen magnetic poles on the assumption that each magnetic pole has one slot per each phase, while each fan has twelve blades. Thus, there arises a similar problem that the degree component of the air stream sound generated by the slots on the stator core coincides with the degree component of the air stream sound generated by both the fans, resulting in the sound level of the composite air stream sound being elevated.

SUMMARY OF THE INVENTION

The present invention has been made in consideration of the aforementioned problems.

An object of the present invention is to provide a vehicular AC generator which assures that an air stream sound can substantially be attenuated wherein the degree component of the air stream sound generated by blades on each of front and rear fans does not coincide with the degree component of the air stream generated by magnetic pole cores, and moreover, the degree component of the air stream sound generated by the front fan does not coincide with the degree component of the air stream sound generated by the rear fan.

Another object of the present invention is to provide a vehicular AC generator which assures that the air stream sound generated not only by blades on each fan but also by slots on a stator core can substantially be attenuated wherein the degree component of the air stream sound generated by the blades on the fan does not coincide with the degree component of the air stream sound generated by the slots on the stator core.

According to the present invention, there is provided a vehicular AC generator comprising a stator connected to a front bracket and a rear bracket, a rotor fixedly mounted on a rotational shaft rotatably supported by both the brackets with the aid of bearings and including a plurality of magnetic poles each having an excitation coil held thereon, the rotor having plural pairs of magnetic pole cores alternately arranged thereon in the circumferential direction, and a front fan and a rear fan secured to the opposite ends of the magnetic pole core wherein a plurality of air intake holes are formed around the inner circumference of each bracket and a plurality of air outlet holes are formed around the outer circumference of the same so that as the rotor is rotated, cooling air is introduced into the generator through the air intake holes and then exhausted to the outside through the air outlet holes while cooling the interior of the generator, wherein the number of blades on each fan is set to an odd numeral, and the number of blades on the front fan differs from that of the rear fan.

The generator may includes a cover which is secured to the outer end of the rear bracket with a plurality of air intake holes formed thereon. As the rotor is rotated, cooling air is introduced into the generator first through the air intake holes on the cover and then through the air intake holes on the rear bracket in order to cool the interior of the generator.

The number of blades on each fan may be set to a certain odd numeral which is not a multiple of numeral of three.

Alternatively, the number of blades on at least on the front fan may be set to a certain odd numeral which is not a multiple of the number of air intake holes on the front cover.

It should be noted that the aforementioned characterizing feature of the generator is equally applicable to an ordinary three-phase AC generator as it is.

Other objects, features and advantages of the present invention will become apparent from reading of the following description which has been made in conjunction with the accompanying drawings.

DESCRIPTION OF THE PREFERRED EMBODIMENTS

The present invention will now be described below with reference to FIG. 1 and FIG. 2 which illustrate a preferred embodiment thereof.

Embodiment 1

Figure 1:
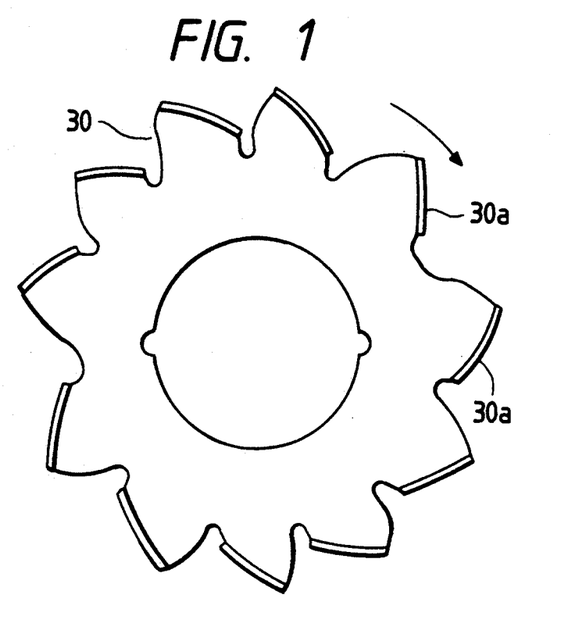
FIG. 1 is a front view of a front fan for a vehicular AC generator in accordance with an embodiment of the present invention.
Figure 2:
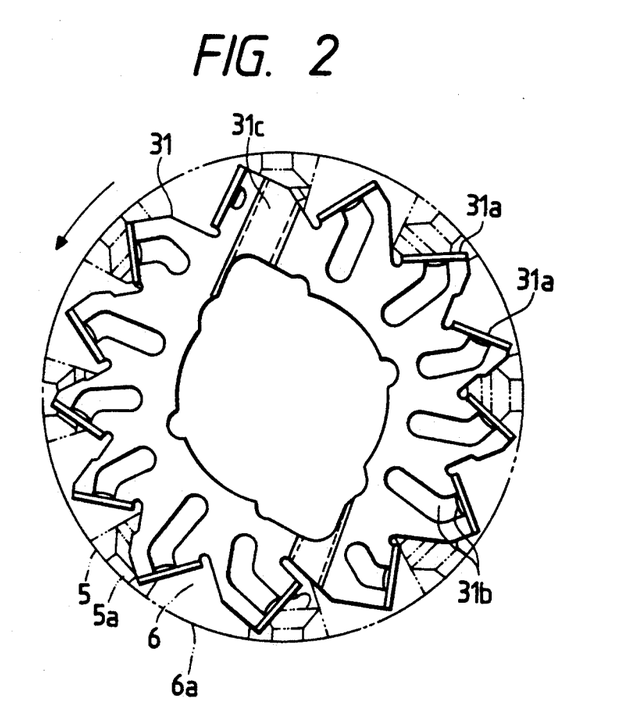
FIG. 2 is a front view of a rear fan for the generator in accordance with the embodiment of the present invention.

FIG. 1 is a front view of a front fan for a vehicular AC generator in accordance with the embodiment of the present invention and FIG. 2 is a front view of a rear fan for the same. It should be noted that a structure of the generator of the present invention is substantially identical to that of the conventional generators described above with reference to FIG. 3 and FIG. 4 with the exception that the number of blades on each fan is changed in the following manner in order to attenuate the air stream sound generated by both the fan.

In FIG. 1, reference numeral 30 designates a front fan which is secured to one ends of magnetic pole cores 5. Eleven blades 30a are formed on the fan 30 by bending. In addition, reinforcement ribs (not shown) are press-formed on the fan 30 in the same manner as reinforcement ribs 31b on a rear fan 31. The generator includes sixteen magnetic pole cores 5 and 6 which are not shown in the drawing for the purpose of simplification of illustration.

As shown in FIG. 2, thirteen blades 31a are formed on the rear fan 31 by bending. In the drawing, reference numeral 31c designates projected parts which are press-formed on the rear side of the rear fan 31 so as to allow lead wires to extend therethrough. The generator includes sixteen magnetic pole cores 5 and 6 as represented by chain lines.

As described above, each of the front fan 30 and the rear fan 31 has an odd number of blades. Namely, the front fan 30 has eleven blades, while the rear fan 31 has thirteen blades. Thus, the number of blades on both the fans 30 and 31 is different from an even number of magnetic poles (sixteen magnetic poles) as in the conventional apparatus. Consequently, the degree component of the air stream sound generated by both the fans 30 and 31 does not overlap the degree component of the air stream sound generated by the magnetic pole cores 5 and 6, resulting in the sound level of the composite air stream sound being reduced substantially.

Embodiment 2

A few examples representing the relationship between the number of blades on a front fan, the number of blades on a rear fan, the number of air intake holes on the front fan and the number of air intake holes on the rear fan of a three-phase AC generator are shown in Table 1 with respect to case that the generator includes twelve magnetic poles as well as case that it includes sixteen magnetic poles.

TABLE 1

| number of poles (P) | number of blade on front fan | number of blades on rear fan | number of slots (3 × P) | number of air intake holes on front bracket | number of air outlet holes on rear bracket |
|---|---|---|---|---|---|
| 12 | 11 | 13 | 36 | 14 | 5 |
| 16 | 11 | 13 | 48 | 14 | 5 |

In this embodiment, the number of blades on each fan is determined such that it is not a multiple of the number of air intake holes 12a, 13a on both the bracket 12, 13, and moreover, it is not a multiple of numeral three corresponding to the three-phase. Thus, the degree component of the air stream sound generated by each of the fans 30 and 31 does not coincide with the degree component of the air stream sound generated by the slots on the stator core of the generator. Incidentally, the number of slots on the stator core is generally represented by 3×P×n where P designates the number of magnetic poles and n designates the number of slots on each magnetic pole per each phase. The above table shows the case of n=1.

As is apparent from the above description, according to the present invention, each of the front and rear fans has an odd number of blades, and moreover, the number of blades on the front fan differs from that of the rear fan. Thus, the degree components of the air stream sound generated by the blades on the front fan does not coincide with that of the rear fan, resulting in the sound level of the composite air stream sound being substantially reduced. Also in the case of a three-phase AC generator, the number of blades on each of the front and rear fans is determined such that it is not a multiple of a numeral of three. Thus, the degree component of the air stream sound generated by the slots on the stator core does not coincide with that of the air stream sound generated by the blades on the front and rear fans. In addition, since the number of blades on the front and rear fans does is determined such that it is not a multiple of the number of air intake holes on the front and rear brackets, the degree component of the air stream sound generated by the air intake holes does not coincide with the degree component of the air stream sound generated by the blades on the front and rear fans, whereby the composite air stream sound can substantially be attenuated. Further, since the number of blades on each of the front and rear fans is determined such that it is not a multiple of the number of air intake holes on each of the front and rear brackets, the degree component of the air stream sound generated by the air intake holes on each bracket does not coincide with the degree component of the air stream sound generated by the blades on each fan. Thus, the composite air stream sound can substantially be attenuated too.

While the present invention has been described above with respect to a few preferred embodiments thereof, it should of course be understood that the present invention should not be limited only to these embodiments but various change or modification may be made without departure from the scope of the present invention as defined by the appended claims.

What we claim is:

1. In a vehicular AC generator comprising a stator connected to a front bracket and a rear bracket, a rotor fixedly mounted on a rotational shaft rotatably supported by both of said brackets and by bearings and including a plurality of magnetic poles each having an excitation coil held thereon, said rotor having plural pairs of magnetic pole cores arranged therein in a circumferential direction, and a front fan and a rear fan secured to opposite ends of said magnetic pole cores wherein a plurality of air intake holes are formed around an inner circumferential portion of each bracket and a plurality of air outlet holes are formed around an outer circumferential portion of each bracket so that as said rotor is rotated, cooling air is introduced into said generator through said air intake holes and then exhausted through said air outlet holes while cooling an interior portion of said generator, the improvement wherein a total number of blades on each fan is set to an odd numeral, and a total number of blades on said front fan differs from that of said rear fan.

2. The vehicular AC generator according to claim 1 further including a cover secured to an outer end of said rear bracket, said cover being formed with a plurality of air intake holes through which cooling air is introduced into said generator on said rear bracket to cool said interior portion of said generator.

3. The vehicular AC generator according to claim 1 or 2, wherein a total number of blades on each fan is set to an odd numeral which is not said multiple of three, and said total number of blades on said front fan differs from that of said rear fan.

4. The vehicular AC generator according to claim 1 or 2, wherein said total number of blades on said front fan is set to an odd numeral which is not a multiple of a number of air intake holes formed on said front bracket, and said total number of blades on said front fan differs from that of said rear fan.

5. The vehicular AC generator according to claim 1, wherein said generator is three - phase.

* * * * *

UNITED STATES PATENT AND TRADEMARK OFFICE
CERTIFICATE OF CORRECTION

PATENT NO. : 5,235,229
APPLICATION NO. : 07/945616
DATED : August 10, 1993
INVENTOR(S) : Toshinori Tanaka et al.

It is certified that error appears in the above-identified patent and that said Letters Patent is hereby corrected as shown below:

Column 1, line 23, "pole portions" should read --poles--.

Column 2, line 43, "pole cores 5 and 6" should read --poles 5a and 6a--; line 55, "pole cores" should read --poles--; line 56, "the magnet pole cores are not" should read --only poles 5a are--; line 62, "magnet pole cores" should read --magnetic poles--.

Column 3, lines 26 and 45, "pole cores" should read --poles--; line 43, "poles" should read --pole cores--; line 48, "core" should read --cores--.

Column 4, line 51, "one ends of magnetic pole cores 5" should read --one end of magnetic pole core 5--.

Column 4, lines 56 and 64 and column 5, line 7 and 8 "pole cores 5 and 6" should read --poles 5a and 6a--.

Claim 1, line 5, "poles" should read --pole cores--; line 7, "pole cores" should read --poles-- and "therein" should read --thereon--.

Claim 3, line 3, "said" should read --a--.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 5,235,229  
APPLICATION NO. : 07/945616  
DATED : August 10, 1993  
INVENTOR(S) : Toshinori Tanaka et al.

Page 1 of 1

It is certified that error appears in the above-identified patent and that said Letters Patent is hereby corrected as shown below:

Column 1, line 23, "pole portions" should read --poles--.

Column 2, line 43, "pole cores 5 and 6" should read --poles 5a and 6a--; line 55, "pole cores" should read --poles--; line 56, "the magnet pole cores are not" should read --only poles 5a are--; line 62, "magnet pole cores" should read --magnetic poles--.

Column 3, lines 26 and 45, "pole cores" should read --poles--; line 43, "poles" should read --pole cores--; line 48, "core" should read --cores--.

Column 4, line 51, "one ends of magnetic pole cores 5" should read --one end of magnetic pole core 5--.

Column 4, lines 56 and 64 and column 5, line 7 and 8 "pole cores 5 and 6" should read --poles 5a and 6a--.

Column 6, Claim 1, line 27, "poles" should read --pole cores--; line 29, "pole cores" should read --poles-- and "therein" should read --thereon--.

Column 6, Claim 3, line 51, "said" should read --a--.

This certificate supersedes the Certificate of Correction issued April 14, 2009.

Signed and Sealed this

Fifth Day of May, 2009

JOHN DOLL  
*Acting Director of the United States Patent and Trademark Office*